United States Patent [19]

Napolitano

[11] Patent Number: 4,532,958

[45] Date of Patent: Aug. 6, 1985

[54] CHECK VALVE HAVING REPLACEABLE VALVE ASSEMBLY

[75] Inventor: Pellegrino E. Napolitano, Middletown, N.J.

[73] Assignee: Hudson Engineering Company, Bayonne, N.J.

[21] Appl. No.: 428,764

[22] Filed: Sep. 30, 1982

[51] Int. Cl.³ ............................................. F16K 25/00
[52] U.S. Cl. ........................... 137/454.2; 137/454.6; 137/515.7; 137/516.27
[58] Field of Search ........... 137/515.7, 516.27, 516.25, 137/454.6, 454.2

[56] References Cited

U.S. PATENT DOCUMENTS

| | | | |
|---|---|---|---|
| 2,750,958 | 6/1956 | Baker | 137/515.7 |
| 2,845,085 | 7/1958 | Robbins | 137/454.6 |
| 2,858,838 | 11/1958 | Scaramucci | 137/454.2 |
| 2,870,784 | 1/1959 | Walls | 137/515.7 X |
| 2,900,999 | 8/1959 | Courtot | 137/516.27 UX |
| 3,054,422 | 9/1962 | Napolitano | 137/516.27 X |
| 3,780,758 | 12/1973 | DeVries | 137/454.6 |
| 3,970,563 | 7/1976 | Codo | 137/454.2 X |
| 4,039,003 | 8/1977 | Cheek | 137/454.6 X |

FOREIGN PATENT DOCUMENTS 1237487 6/1971 United Kingdom ........... 137/516.27

Primary Examiner—Harold W. Weakley
Attorney, Agent, or Firm—Fleit, Jacobson, Cohn & Price

[57] ABSTRACT

A check valve having improved sealing qualities and provided in the form of a replaceable assembly of a valve member and valve seat to avoid the need to replace the valve housing. The sealing surfaces are defined by obliquely directed, outwardly tapering sealing members which are capable of deflection to provide increased sealing area as the pressure on the downstream side of the assembly is increased. The valve assembly includes an annular base having an inwardly directed, tapered valve seat and an annular sleeve secured thereto in coaxial relationship. A spider member is secured to the other end of the sleeve and includes inwardly directed radial means terminating in a hub having a cylindrical bore to support the stem of the valve member. A spring is provided to bias the valve member against the valve seat.

1 Claim, 2 Drawing Figures

U.S. Patent
Aug. 6, 1985
4,532,958
FIG. 1
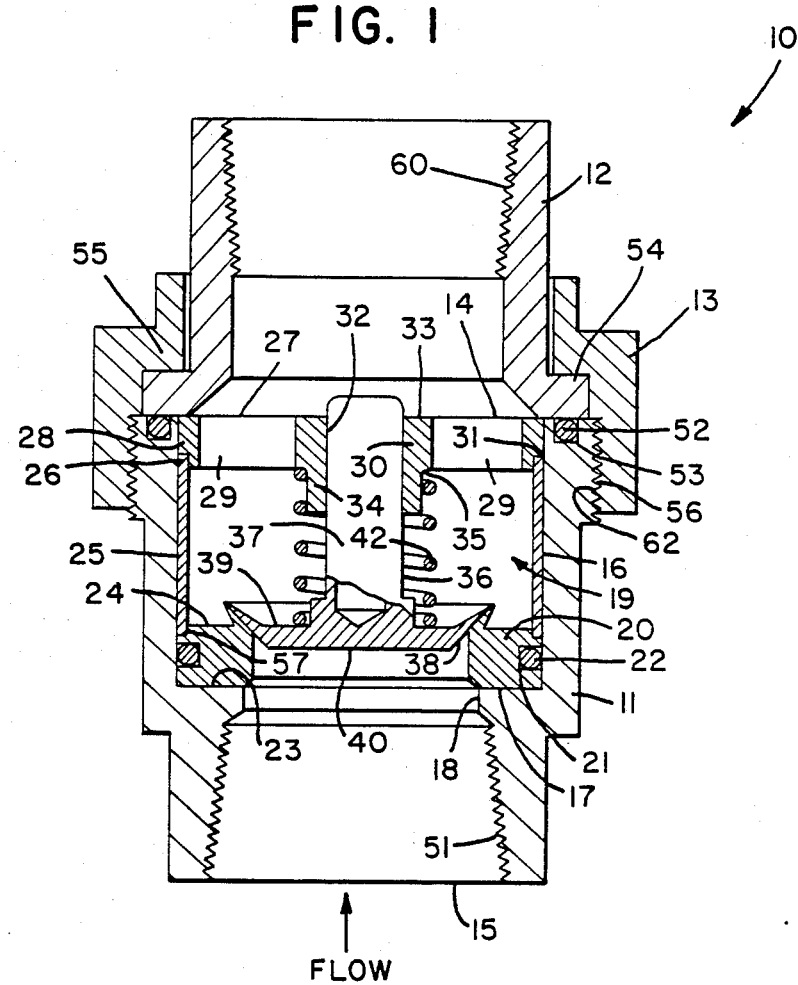
FLOW
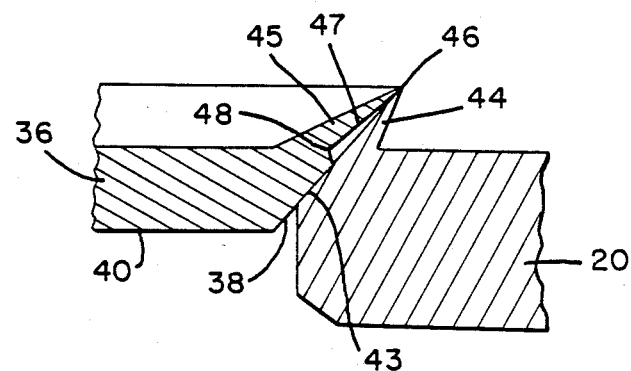
FIG. 2

CHECK VALVE HAVING REPLACEABLE VALVE ASSEMBLY

BACKGROUND OF THE INVENTION

This invention relates to fluid check valves, and more particularly to an improved check valve structure wherein the valve assembly is a replaceable unit which can be positioned within a suitable housing, such as a union, which, in turn, can be connected to a fluid conduit.

In the past, check valves have generally been of an integral, unitary structure adapted to be directly connected to a fluid system. Generally, a valve seat was formed in a housing-like member, and a movable valve element was positioned within the housing for movement toward and away from the valve seat. One type of valve member frequently used in such valves is a ball, to provide a ball-type check valve wherein the ball cooperates with a conical valve seat to provide a line-type seal so that fluid is permitted to flow in one direction but not in the other. Another type of known check valve structure involves a generally conical valve member which cooperatively engages with a generally conical valve seat, the valve member being spring biased against the valve seat, the spring force being such that flow through the valve is permitted only upon the pressure of the fluid attaining a predetermined level. Valves of the latter type are most often utilized in applications wherein a pressure relief valve is required in order to permit flow to take place from a pressurized system to relieve the pressure therein when it reaches a predetermined level. An example of a spring-operated, conical valve face pressure relief valve is shown in U.S. Pat. No. 3,054,422, which issued Sept. 18, 1962, to the inventor of the present invention.

Because the prior art valve structures incorporated the valve seat as a substantially integral part of the housing, or a part that, although removable, was cumbersome to remove, if the valve seat were damaged by corrosion, distortion, wear, or the like, the valve would require replacement with an entirely new valve, which oftentimes involved considerable time and expense. Consequently, it is desirable to provide a check valve structure wherein a replaceable valve assembly is utilized and thereby permit replacement merely of the valve and valve seat without the necessity for replacing the valve housing.

SUMMARY OF THE INVENTION

It is an object of the present invention to provide an improved check valve structure wherein the check valve seat and valve member are included in a replaceable element which is securely but removably retained within a housing which, in turn, is adapted for positioning in a fluid conduit.

It is another object of the present invention to provide an improved check valve structure wherein the housing within which the valve seat and valve member are positioned can be readily connected to and disconnected from a fluid system to facilitate removal and replacement of the valve seat and valve member.

Briefly stated, in accordance with one aspect of the present invention, an improved check valve structure is provided wherein the check valve is positioned within a housing such as a union, which, in turn, is inserted in a fluid line. A valve assembly is removably positioned within the housing to permit flow in only one direction. The valve assembly includes an outer casing which is positionable within the housing in substantially fluid-tight relationship therewith, and includes a generally conical valve seat and a movable conical valve member slidable toward and away from the valve seat. Biasing means are provided to urge the valve member against the valve seat. The conical valve seat and the conical valve member each have outwardly converging, tapered conical faces to provide substantially line contact therebetween at their outer peripheries and are profiled such that they are characterized by sufficient resiliency whereby increased fluid pressure on the valve member causes progressively greater annular surface contact to insure positive sealing.

BRIEF DESCRIPTION OF THE DRAWING

FIG. 1 is an axial cross-sectional view of a check valve structure in accordance with the present invention, the valve assembly shown with the valve in the closed position.

FIG. 2 is an enlarged, fragmentary, cross-sectional view of the valve member and the valve seat shown in FIG. 1.

DESCRIPTION OF THE PREFERRED EMBODIMENTS

Referring now to the drawing, and particularly to FIG. 1 thereof, there is shown a check valve structure in accordance with the present invention housed within a housing 10 positioned in a fluid line. Housing 10 is a union with female ends consisting of a first section 11 (upstream side), a second section 12 (downstream side) and a connecting ring 13, each of which is of generally circular cross section. First section 11 is internally threaded at 51, its upstream end 15, and defines an enlarged coaxial recess 16 which terminates in an intermediate, inwardly extending abutment 17.

Slidably positioned within recess 16 and in abutting relationship with abutment 17 is a valve assembly 19, which includes a valve seat in the form of an annular base 20 having an outwardly opening peripheral groove 21 within which a sealing member 22, such as a flexible O-ring is positioned. Annular base 20 includes a lower face 23 which is in contact with abutment 17, and an upper face 24 having a rabbet 57. A cylindrical sleeve 25 is received at one end on rabbet 57 and extends in an upward direction. Secured to the upper end 26 of sleeve 25 is a spider member 27, the outer ring 28 of which is formed with a rabbet 31. The plurality of radially positioned connecting ribs 29 of spider member 27 extend from outer ring 28 to inner hub 30. As shown, sleeve 25 is received on rabbet 31 of outer ring 28. Sleeve 25 is preferably secured to seat 20 and to outer ring 28 by press fits, although other securing means (not shown) such as welding, can also be employed, if desired.

Hub 30 includes an axial cylindrical bore 32 which extends therethrough, an upper face 33, and a reduced diameter, concentric lower portion 34 which defines a shoulder 35. A movable valve member 36 is axially slidably positioned within bore 32 and includes a cylindrical stem 37. A generally conical valve member 38 is integral with stem 37. A compression coil spring 42 is positioned around stem 37 and bears against valve member 38 and shoulder 35 to urge the valve member 38 against valve seat 20 to maintain the valve in the closed position.

As illustrated in FIG. 2, both valve member 38 and valve seat 20 have cooperating faces oriented at oblique angles relative to the axis of housing 10. Valve seat 20 includes an extension 44 which tapers upwardly, diminishing in thickness in an outward direction relative to the axis of housing 10. Valve member 38 also tapers in thickness along extension 45. The outer edges of extensions 44 and 45 meet at line 46 when the valve is closed. The angular inclination of extension 45 relative to the housing axis is slightly greater than that of extension 44 to provide the contact at line 46. The valve member 38 is relieved at 47 by inclining a portion of the valve face at a greater angle to the axis than the remainder thereof to define an annular space between extensions 44 and 45 in order to facilitate separation thereof when the valve is to be opened. Thus the outermost edges of valve member 38 and valve seat 20 are thinner than the inner portions thereof to permit a line contact outer seal therebetween at line 46, and if the pressure on the downstream side 39 of valve member 38 increases, the effect of that pressure increase is to force valve member 38 and valve seat 20 into tighter engagement. The thin sections of the extensions 44 and 45 allow deflection to insure positive line contact.

Valve member 38 and valve seat 20 are preferably made from heat treated stainless steel which has the flexibility desired at extensions 44 and 45, and can withstand both corrosive and high temperature environments.

Second section 12 of housing 10 includes a flange 54 for connection to first section 11 and internal threads 60 for connection to a fluid line.

An O-ring 52 is provided to seal the joint between sections 11 and 12. Connecting ring 13 is received on section 12 and has internal threads 56 which threadedly engage external threads 62 of first section 11. As the threads 56 and 62 are engaged, connecting ring 13 bears on flange 54 thereby drawing connecting sections 11 and 12 together. In this process, flange 54 bears on the upper surface of outer ring 28, thereby securing assembly 19 in recess 16.

When it is desired to replace or remove valve assembly 19, housing 10 is opened by merely unscrewing sealing ring 13 and separating sections 11 and 12. Valve assembly 19 can then be removed from section 11 and a new assembly substituted therefor, or it can be left out entirely, if desired.

While particular embodiments of the present invention have been illustrated and described, it will be apparent to those skilled in the art that various changes and modifications can be made without departing from the spirit and scope of the present invention, and it is intended to cover in the appended claims all such changes and modifications that fall within the scope of the present invention.

What is claimed is:

1. A replaceable check valve assembly comprising:
   (a) an annular base member including a laterally outwardly opening peripheral groove to receive an outer peripheral seal in the form of a flexible O-ring positioned inwardly of the ends of said base member, said base member having a conical valve seat spaced inwardly of said peripheral seal and including a tapered extension which diminishes in thickness in an outward direction and is obliquely outwardly inclined relative to the axis of said assembly to define an opening;
   (b) an annular sleeve having a first end removably secured to said base member and a second end;
   (c) a spider member having an outer ring removably secured to the second end of said sleeve, said spider member including a plurality of radially inwardly directed ribs termination in a hub, said hub including a central bore;
   (d) a valve member including a stem slidably received within said bore, said valve member having a conical valve face at one end including an outwardly extending tapered extension adapted to engage in surface contact with said tapered extension of said valve seat and close the opening defined thereby, said valve face including an inclined portion having a greater inclination relative to the axis of the assembly than the inclination of the valve face to define an annular space between said valve face and said valve seat and facilitate separation of said valve face and said valve seat; and
   (e) biasing means to bias said valve member against said valve seat, said biasing means including a compression coil spring.

* * * * *